May 31, 1955  D. H. MITCHELL  2,709,743
SOLDERING IRON
Filed Oct. 1, 1952
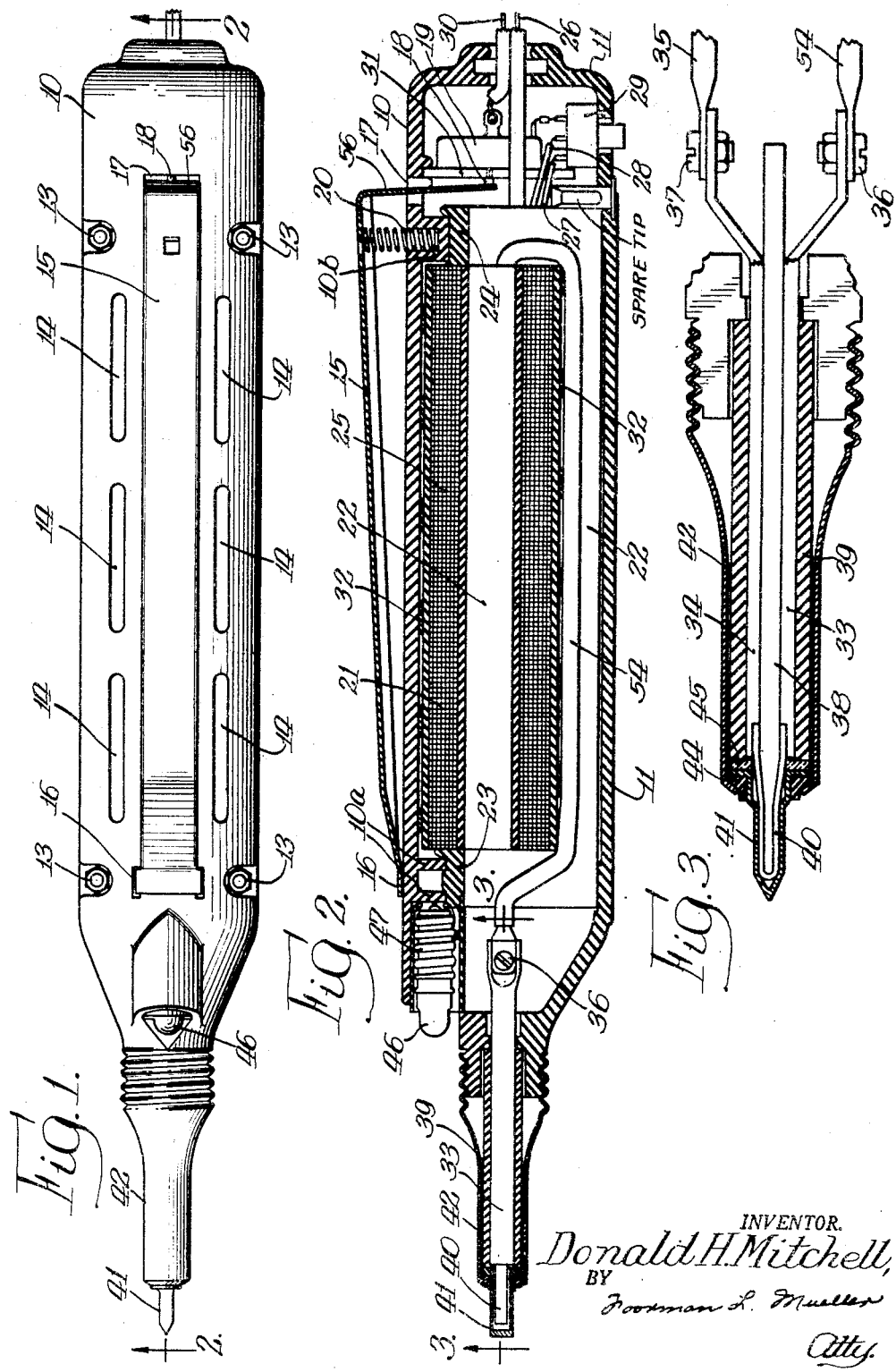
INVENTOR.
Donald H. Mitchell,
BY
Foorman L. Mueller
Atty.

United States Patent Office 2,709,743
Patented May 31, 1955

2,709,743

SOLDERING IRON

Donald H. Mitchell, Mineral Wells, Tex., assignor to Mitchell Industries, Inc., Mineral Wells, Tex., a corporation of Texas Application October 1, 1952, Serial No. 312,465

4 Claims. (Cl. 219—26)

This invention relates to electrically heated apparatus and more particularly to an electrically heated soldering iron for intermittent use.

Most prior art soldering irons utilize heat conductive principles to supply heat to the tip portion of the instrument. In such soldering irons the electrical heating element usually takes the form of a coil of resistance wire which is wound upon or surrounded by a metallic body of high heat conductivity, but which is electrically insulated therefrom. The metallic body is utilized to transfer heat from the heating element to the tip portion, the latter being secured to the extremity of the instrument in heat conducting relation with the metallic body. Such instruments are advantageous since they permit a rugged construction and may be utilized for long periods of time without the need for servicing or replacements. However, an inherent disadvantage in soldering irons of this type is that several minutes are required after the heating element is energized before the tip is heated to optimum soldering temperature. It has long been considered desirable, however, to provide a soldering iron in which the heating element thereof may be energized intermittently, while the iron is in use, and in which such energization of the heating element develops a soldering temperature at the tip almost instantaneously.

In an effort to provide more rapid heating of the tip portion, soldering irons have been devised in which the tip is used in conjunction with a carbon electrode to develop an arc in the interior of the tip. Although rapid heating of the tip is achieved with such an arrangement, it has been found that corrosion quickly occurs impairing the efficiency of the device. In another arrangement an electric current is passed through the tip itself, but this results in a large and cumbersome soldering iron which is difficult to handle and tiring when used for any length of time. Recently, devices have been produced in which the tip portion comprises a substantially U- or V-shaped electrode through which electric current is passed, the end of the electrode being used as a soldering surface. The chief disadvantage of the latter arrangement is that any attempt to improve the composition of the electrode to produce an efficient soldering surface impairs the quality of the electrode as a heat-producing electrical conductor. For that reason an electrode that strikes a mean between these two requirements has been found to be generally unsatisfactory and to require frequent replacements.

It is, accordingly, an object of the present invention to provide a soldering iron in which rapid heating of the tip portion is achieved, and yet in which the above described disadvantages of the prior art arrangements are overcome.

A further object of the present invention is to provide an improved soldering iron that is rugged in construction, compact in size, and highly efficient and economical in operation.

Another object of the invention is to provide a soldering iron whose tip portion may be heated within a few seconds of energization of the heating element thereof, and yet which is constructed so that its various components may have a long life and require a minimum of servicing or replacement.

Yet a further object of the invention is to provide a soldering iron having a minimum of component parts, and which may be conveniently assembled and constructed so as to be economical in cost.

Yet a further object of the invention is to provide a soldering iron in which heat is concentrated at the tip portion thereof to the exclusion of the other components so that optimum soldering temperature is achieved with minimum power consumption.

A still further object of the invention is to provide an improved rapid heating soldering iron for intermittent use which includes a control switch of convenient and efficient construction.

Yet another object of the invention is to provide an improved soldering iron of the rapid heating type in which no electric current flows through the tip portion, and in which the tip may be quickly and easily removed should the occasion arise.

The features of this invention which are believed to be new are set forth with particularity in the appended claims. The invention itself, however, together with further objects and advantages thereof, may best be understood by reference to the following description when taken in conjunction with the accompanying drawing in which:

Fig. 1 is an overall view of a soldering iron constructed in accordance with the invention;

Fig. 2 is a sectional view of the instrument taken at right angles to the view of Fig. 1; and Fig. 3 is a sectional view of a portion of the soldering iron taken along the lines 3—3 of Fig. 2.

The soldering iron of this invention comprises a hollow, substantially cylindrical handle portion, with a step-down transformer supported within the handle having a primary winding and a secondary winding. Input connections are included in the handle for coupling the primary winding to a source of energizing potential, and a switching element is connected in the input connection. A spring biased actuating arm for the switching element is mounted on the outer surface of the handle, the arm being fulcrumed at one end and extending longitudinally over substantially the entire length of the handle. A pair of longitudinal electrically conductive strips or bus-bars extend from one end of the handle and are electrically connected to the secondary winding. A U- or V-shaped electrically conductive heater strip, having a resistance high compared with the resistance of the aforesaid pair of strips, is secured to the ends of the pair of strips and interconnects one with the other. The heater strip projects beyond the ends of the bus-bars, and a hollow thin-walled heat conductive tip portion having an electrically insulated inner surface is supported thereover. A removable sleeve is threaded at one end to the end of the handle portion and has a bent-over portion at its extremity remote from the handle for removably retaining the soldering iron tip on the heater strip.

Referring now to Figs. 1–3 the soldering iron has a substantially cylindrical hollow handle comprising an upper housing 10 and a lower housing 11, the housings being held together by studs 13. Both housings 10 and 11 have a series of ventilating openings 14 therein, and the upper housing has a switch actuating arm 15 fulcrumed at one end at 16 on the outer surface thereof and extending along substantially the entire length of the handle. The free end of actuating arm 15 has a bent-over portion 56 which extends through an aperture 17 into the interior of the handle and into operative engagement with a spring-biased push-button 18 of an electric on-off switch 19. A resilient coil spring 20 coacts with housing 10 and with arm 15 normally biasing the free end of the actuating arm away from the handle and the bent-over portion into engagement with button 18 of switch 19 urging the button inwardly. In this condition switch 19 is open, but it closes when arm 15 is depressed toward housing 10 to cause portion 56 to move out of engagement with push-button 18.

A transformer 21 is supported within the interior of the handle, and the transformer is constructed to have a long slender configuration so that the handle need not be unduly bulky but may be conveniently grasped in the hand of an operator. The transformer has a core section 22 which is firmly held against lower housing 11 by projections 10a and 10b of upper housing 10, the projections bear against resilient pads 23 and 24, the latter being utilized to provide a shock mount for the transformer core and to compensate for manufacturing tolerances. A primary winding 25 is wound on core 22, one end of the primary being connected directly to lead 26 extending to one terminal the 110 volt main, while low- and high-voltage taps on the primary winding are connected by leads 27 and 28 to a high-low switch 29 and, thence, through switch 19 and lead 30 to the other terminal of the 110-volt main. Switches 19 and 29 are supported by a switch mounting plate 31 extending across the handle in the illustrated position with button 18 extending through an aperture therein. Operation of switch 29 connects the terminal of switch 19 to one or the other of the two taps on primary 25 to increase or decrease the current flow in secondary winding 32 of the transformer. The secondary 32 may have two or three turns of heavy wire and delivers, for example, one volt and 40 amperes to the heating element of the soldering iron. A pair of electrically conductive strips or bus-bars 33 and 34 extend longitudinally from one end of the handle and are electrically connected to the extremities of the secondary winding by leads 54 and 35, the leads being removably connected to the bus-bars by screws 36 and 37. A strip of insulating material 38 is inserted between bus-bars 33 and 34 to maintain the bus-bars in a spaced, mutually parallel relationship and insulated one from the other; and an insulating sleeve 39 is mounted co-axially with the bus-bars and extends to their outer extremities. A heater element which may take the form of a U-shaped strip 40 is secured to the end of bus-bars 33 and 34, and interconnects these ends. Strip 40 may be composed of a nickel-chrome alloy such as "Nichrome" and is electrically conductive but has a resistance higher than that strips 33 and 34 so that substantially all the heat is developed at strip 40.

A tip portion 41, which is a hollow thin walled member with bent-over ends, is supported over heater strip 40 normally in spaced relation therewith, the tip preferably having an insulating coating such as an oxide film on its inner surface to insure that it is insulated from the strip. A retainer sleeve 42 is threaded at one end to a threaded portion 43 at the end of the handle, and the sleeve has a bent-over portion at its free end. This bent-over portion is used to retain tip 41 in position, and an insulating washer 44 is interposed between it and the bent-over end of tip 41 thermally to isolate the tip from the other components of the soldering iron. Likewise, an insulating washer 45 is interposed between the bent-over ends of tip 41, and the front of strips 33, 34 and insulating sleeve 39 to assure thermal and electrical insulation of tip 41 from these components.

An indicating light bulb 46 is screwed into socket 47 in the front end of the handle and a suitable connection is made to a tap on transformer 21 so that the bulb is energized whenever the iron is in use to provide light at the working surfaces.

Whenever pressure is exerted on actuating arm 15, main switch 19 closes so that an energizing circuit is established to the primary of transformer 21. This causes current to be supplied from secondary 32 and through strips 33 and 34 to heating strip 40. As previously stated, the current in the heating strip may be increased or decreased by actuation of high-low switch 29 connected to selected taps on the primary winding. Moreover, whenever actuating arm 15 is depressed, bulb 46 is energized lighting the working surface.

Practically the entire heat developed by the soldering iron is concentrated in heating element 40 directly within the hollow tip 41 and the tip achieves a soldering temperature by radiation from the heating element in a matter of seconds. Moreover, since tip 41 does not constitute any portion of the electrical circuit, it may be composed of hard copper to constitute an ideal and long-life soldering surface. When the need arises the tip may be replaced merely by unscrewing retaining sleeve 42 without disturbing the electrical connections of the unit.

The use of the electrical heating tool of this invention is not limited to soldering but may have many other applications. For example, tip 41 may take the form of a hollow knife blade for linoleum cutting, or a chisel blade for ice removal in freezing unit; or the tip may be constructed so that the tool may be used as a branding iron, or for hot stamping purposes. Therefore, while a particular embodiment of the invention has been shown and described, it is evident that modifications may be made and it is intended to cover in the appended claims all such modifications as fall within the true spirit and scope of the invention.

I claim:

1. An electrical heating tool including in combination: a hollow, substantially cylindrical handle portion; a step-down transformer supported within said handle and having a primary winding and a secondary winding; input connections for coupling said primary winding to a source of energizing potential; a switching element included in said handle and connected to at least one of said input connections; an actuating arm for said switching element mounted on the outer surface of said handle portion, fulcrumed at one end and extending longitudinally over substantially the entire length of said handle, said arm having a bent-over portion extending into said handle adjacent said switching element; resilient means co-acting with said handle and said actuating arm for normally biasing said arm away from said handle and said bent-over portion into operative engagement with said switching element; a pair of mutually insulated electrically conductive elements extending from said handle and electrically connected to said secondary winding; a heater element having a resistance high compared with the resistance of said conductive elements interconnecting the ends thereof remote from said handle; a hollow heat-conductive tip portion; and a retainer sleeve removably mounted on one end of said handle for supporting said tip portion in a position surrounding said heater element in close proximity thereto but electrically insulated therefrom.

2. An electrical soldering iron including in combination: a hollow, substantially cylindrical handle portion; a stepdown transformer supported within said handle and having a primary winding and a secondary winding; input connections for coupling said primary winding to a source of energizing potential; a switching element included in said handle portion and connected to at least one of said input connections; an actuating arm for said switching element mounted on the outer surface of said handle portion; a pair of electrically conductive elements extending from said handle and electrically connected to said secondary winding; an insulating member for maintaining said elements in spaced parallel relationship insulated one from the other; an insulating sleeve surrounding said elements and extending to the ends of said elements remote from said handle; a heater element having a resistance high compared with the resistance of said first-mentioned elements secured to and interconnecting the ends of said first mentioned elements remote from said handle, said heater element projecting beyond the end of said insulating sleeve; a hollow heat-conductive tip portion; and a removable retainer sleeve threaded at one end to the end of said handle and surrounding said insulating sleeve, said retainer having a bent-over portion at the extremity thereof for supporting said tip portion adjacent the end of said insulating sleeve so that said tip encloses said heater element in close proximity thereto but electrically insulated therefrom.

3. An electrical soldering iron including in combination: a hollow, substantially cylindrical handle portion; a stepdown transformer supported within said handle and having a primary winding and a secondary winding; input connections for coupling said primary winding to a source of energizing potential; a switching element included in said handle portion and connected to at least one of said input connections; an actuating arm for said switching element mounted on the outer surface of said handle portion; a pair of electrically conductive strips extending longitudinally from said handle and electrically connected to said secondary winding; an insulating member for maintaining said strips in spaced parallel relationship insulated one from the other; an insulating sleeve surrounding said strips and extending to the ends of said strips remote from said handle; a U-shaped electrically-conductive strip having a resistance high compared with the resistance of said first-mentioned strips secured to and interconnecting the ends of said first mentioned strips remote from said handle, said U-shaped strip projecting beyond the end of said insulating sleeve; a hollow, thin-walled, heat-conductive tip portion surrounding said U-shaped strip and having an electrically-insulated inner surface; and a removable sleeve threaded at one end to the end of said handle and surrounding said insulating sleeve, said removable sleeve having a bent-over portion at the extremity thereof for retaining said tip portion over said U-shaped strip adjacent the end of said insulating sleeve.

4. An electrical soldering iron including in combination: a hollow, substantially cylindrical handle portion; a stepdown transformer supported within said handle and having a primary winding and a secondary winding; input connections for coupling said primary winding to a source of energizing potential; a switching element included in said handle portion and connected to at least one of said input connections; an actuating arm for said switching element mounted on the outer surface of said handle portion; a pair of electrically conductive elements extending from said handle and electrically connected to said secondary winding; an insulating member for maintaining said elements in spaced parallel relationship insulated one from the other; an insulating sleeve surrounding said elements and extending to the ends of said elements remote from said handle; a heater element having a resistance high compared with the resistance of said first-mentioned elements secured to and interconnecting the ends of said first mentioned elements remote from said handle, said heater element projecting beyond the end of said insulating sleeve; a hollow heat-conductive tip portion; removable retainer means threadably mounted on one end of said handle portion for supporting said tip portion adjacent the end of said insulating sleeve so that said tip portion encloses said heater element in close proximity thereto but electrically insulated therefrom; and insulating washer means disposed between said tip and said retainer, and between said tip and said first mentioned elements, for insulating said tip thermally and electrically from the rest of said heating tool.

References Cited in the file of this patent

UNITED STATES PATENTS

| Number | Name | Date |
| --- | --- | --- |
| 738,594 | Ayer | Sept. 8, 1903 |
| 1,533,959 | Wagner | Apr. 14, 1925 |
| 2,297,303 | Humfeld | Sept. 29, 1942 |
| 2,359,393 | Sloan | Oct. 3, 1944 |
| 2,560,552 | Caliri | July 17, 1951 |
| 2,558,192 | Nockunas | June 26, 1951 |